(12) United States Patent
McKay

(10) Patent No.: US 10,227,140 B2
(45) Date of Patent: Mar. 12, 2019

(54) SYSTEM AND METHOD FOR DETECTING AND ALERTING THE USER OF AN AIRCRAFT OF AN IMPENDENT ADVERSE CONDITION

(71) Applicant: CMC ELECTRONICS INC., Saint-Laurent (CA)

(72) Inventor: David Edward McKay, Ottawa (CA)

(73) Assignee: CMC ELECTRONICS INC, Quebec (CA)

( * ) Notice: Subject to any disclaimer, the term of this patent is extended or adjusted under 35 U.S.C. 154(b) by 687 days.

(21) Appl. No.: 14/798,459

(22) Filed: Jul. 14, 2015

(65) Prior Publication Data

US 2017/0015434 A1 Jan. 19, 2017

Related U.S. Application Data

(60) Provisional application No. 62/023,332, filed on Jul. 11, 2014.

(51) Int. Cl.
*B64D 45/00* (2006.01)
*B64D 43/02* (2006.01)
(Continued)

(52) U.S. Cl.
CPC ............. *B64D 45/00* (2013.01); *B64C 27/00* (2013.01); *B64C 27/006* (2013.01); *B64D 43/02* (2013.01);
(Continued)

(58) Field of Classification Search
CPC ............ B64D 2045/0085; B64D 45/00; B64C 27/00; B64C 27/006
See application file for complete search history.

(56) References Cited

U.S. PATENT DOCUMENTS 3,037,725 A 6/1962 Treffeisen
4,030,065 A 6/1977 Bateman
(Continued)

FOREIGN PATENT DOCUMENTS

EP 1950718 A1 7/2008

OTHER PUBLICATIONS

Thomas J. Laffey et al, Real-Time Knowledge-Based Systems, AI Magazine (1988), vol. 9 No. 1, pp. 27-45.
(Continued)

*Primary Examiner* — Peter D Nolan
(74) *Attorney, Agent, or Firm* — Cantor Colburn LLP

(57) ABSTRACT

A method detects an impendent situation of an operating aircraft. The method comprises receiving data corresponding to a plurality of parameters related to an operation of the aircraft. It is determined if any of the plurality of parameters is at or beyond at least a first respective threshold by comparing the plurality of parameters with the first respective thresholds. If at least one of the parameters is an outlier parameter at or beyond its first respective threshold, another or others of the plurality of parameters associated to the at least one outlier parameter is identified, the at least one other parameter being selected based on a predetermined combination of parameters representative of an adverse condition. The associated parameters are compared with a stored data combination threshold specific to the associated parameters. A signal indicative of an impending situation is output if the associated parameters are on or beyond the data combination threshold. A system and an aircraft detecting an impendent situation are also provided.

17 Claims, 2 Drawing Sheets

(51) Int. Cl.
*B64C 27/00* (2006.01)
*G05D 1/00* (2006.01)

(52) U.S. Cl.
CPC ... *G05D 1/0055* (2013.01); *B64D 2045/0085* (2013.01)

(56) References Cited

U.S. PATENT DOCUMENTS

| | | | |
|---|---|---|---|
| 4,293,840 A * | 10/1981 | Hadari | G05D 1/0669 244/17.13 |
| 4,319,219 A | 3/1982 | Rein-Weston | |
| 4,433,323 A | 2/1984 | Grove | |
| 4,675,823 A | 6/1987 | Noland | |
| 4,843,554 A | 6/1989 | Middleton et al. | |
| 5,031,102 A | 7/1991 | Robbins et al. | |
| 5,047,942 A | 9/1991 | Middleton et al. | |
| 5,220,322 A | 6/1993 | Bateman et al. | |
| 5,420,582 A | 5/1995 | Kubbat et al. | |
| 5,519,391 A | 5/1996 | Paterson et al. | |
| 5,912,627 A * | 6/1999 | Alexander | B64D 43/02 116/DIG. 43 |
| 6,043,758 A | 3/2000 | Snyder, Jr. et al. | |
| 6,043,759 A * | 3/2000 | Paterson | G01C 5/005 340/946 |
| 6,408,259 B1 | 6/2002 | Goebel et al. | |
| 6,711,479 B1 | 3/2004 | Staggs | |
| 6,732,027 B2 | 5/2004 | Betters et al. | |
| 6,794,007 B2 | 9/2004 | Carr et al. | |
| 6,982,655 B2 | 1/2006 | Vialleton et al. | |
| 7,068,187 B2 | 6/2006 | Ishihara et al. | |
| 7,158,052 B2 | 1/2007 | Zammit-Mangion et al. | |
| 7,198,427 B2 | 4/2007 | Carr et al. | |
| 7,394,402 B2 | 7/2008 | Ishihara et al. | |
| 7,436,323 B2 | 10/2008 | Ishihara et al. | |
| 7,676,304 B2 | 3/2010 | Colich | |
| 7,797,095 B2 | 9/2010 | Rado | |
| 7,907,066 B2 | 3/2011 | Certain | |
| 7,945,425 B2 | 5/2011 | Marx et al. | |
| 7,979,192 B2 | 7/2011 | Morrison et al. | |
| 8,396,617 B2 | 3/2013 | Puig et al. | |
| 8,509,990 B2 * | 8/2013 | Bennett | G07C 5/0808 701/36 |
| 8,600,586 B2 | 12/2013 | Ishihara et al. | |
| 8,653,990 B2 * | 2/2014 | Smyth, IV | G05D 1/0825 244/181 |
| 9,478,077 B2 * | 10/2016 | Chrysanthos | G05B 23/0227 |
| 2001/0052562 A1 | 12/2001 | Ishihara et al. | |
| 2003/0048203 A1 | 3/2003 | Clary et al. | |
| 2004/0044446 A1 | 3/2004 | Staggs | |
| 2005/0192718 A1 | 9/2005 | Delaplace et al. | |
| 2005/0261813 A1 | 11/2005 | Ryan et al. | |
| 2005/0270180 A1 | 12/2005 | Ishihara et al. | |
| 2006/0195235 A1 | 8/2006 | Ishihara et al. | |
| 2007/0120708 A1 | 5/2007 | Ishihara et al. | |
| 2007/0126602 A1 | 6/2007 | Bateman et al. | |
| 2007/0260390 A1 * | 11/2007 | Kim | F01D 21/00 701/100 |
| 2008/0173753 A1 * | 7/2008 | Ishihara | G05B 23/0235 244/17.13 |
| 2008/0274091 A1 | 11/2008 | Slepushkin et al. | |
| 2009/0164057 A1 * | 6/2009 | Lecerf | F01D 21/003 701/14 |
| 2009/0302174 A1 | 12/2009 | Ausman et al. | |
| 2010/0174424 A1 * | 7/2010 | Cornell | G01C 23/00 701/9 |
| 2011/0172855 A1 * | 7/2011 | Marstall | G01C 23/00 701/9 |
| 2011/0191002 A1 | 8/2011 | Whatley et al. | |
| 2011/0313614 A1 * | 12/2011 | Hinnant, Jr. | G01M 5/0041 701/33.9 |
| 2012/0150426 A1 | 6/2012 | Conway | |
| 2012/0310449 A1 | 12/2012 | Hinnant, Jr. et al. | |
| 2013/0173091 A1 | 7/2013 | Abildgaard et al. | |
| 2013/0197739 A1 * | 8/2013 | Gallagher | B64F 5/60 701/31.5 |
| 2013/0274964 A1 * | 10/2013 | Jesse | B64D 45/00 701/14 |
| 2013/0335243 A1 * | 12/2013 | Smyth, IV | B64D 43/02 340/966 |
| 2014/0121863 A1 * | 5/2014 | Barraci | G01C 23/00 701/14 |
| 2014/0253348 A1 * | 9/2014 | Maeda | B64D 43/02 340/966 |
| 2015/0019070 A1 * | 1/2015 | Chrysanthos | G05B 23/0227 701/33.4 |
| 2016/0036513 A1 * | 2/2016 | Klippert | H04W 4/001 455/15 |
| 2016/0288922 A1 * | 10/2016 | He | B64D 45/08 |

OTHER PUBLICATIONS

Lishuai Li and R. John Hansman, Anomaly Detection in Airline Routine Operations Using Flight Data Recorder Data, Report No. ICAT-2013-4, MIT International Center for Air Transportation (ICAT), Jun. 2013, Massachusetts Institute of Technology, Cambridge, MA 02139 USA, 147 pages.

Captain Bryon Mask, "Flight Data Monitoring as a Safety Management Tool", CASS 2007 Presentation, Teledyne Controls, 25 pages.

* cited by examiner

SYSTEM AND METHOD FOR DETECTING AND ALERTING THE USER OF AN AIRCRAFT OF AN IMPENDENT ADVERSE CONDITION

CROSS-REFERENCE TO RELATED APPLICATION

The present application claims priority on U.S. Provisional Patent Application Ser. No. 62/023,332, incorporated herein by reference.

TECHNICAL FIELD

The application relates generally to aircraft and, more particularly, to flight management systems and methods in aircraft.

BACKGROUND OF THE ART

Aircraft are subject to numerous aerodynamic phenomena that may place strain on the capability of the pilot to maintain adequate control. Efforts related to the art have concentrated on collecting data for post-flight analysis, during which time adverse events may be detected, analyzed, and corrective measures may be introduced directed at preventing future similar events.

Prior-art flight data monitoring (FDM) systems capture flight data, to subsequently analyze and determine if the pilot, aircraft systems, or aircraft itself deviated from "normal" operating conditions. As mentioned above, the determination of this deviation is typically done post-flight. The deviation data allows an analysis to investigate pre-defined exceedances for corrective action and trend analysis. Hence, prior-art flight data monitoring systems are designed to respond to normally unreported events, to modify procedures and behaviors in a follow-up educational manner, to train pilots and prevent incidents. Thus, traditional FDM systems support post-flight analysis for detection of inherently unsafe events—permitting intervention prior to potential occurrences on future flights.

SUMMARY

In one aspect, there is provided a method for detecting an impendent situation of an operating aircraft, the method comprising: receiving data corresponding to a plurality of parameters related to an operation of the aircraft; determining if any of the plurality of parameters is at or beyond at least a first respective threshold by comparing the plurality of parameters with the first respective thresholds; if at least one of the parameters is an outlier parameter at or beyond its first respective threshold: identifying at least one other of the plurality of parameters associated to the at least one outlier parameter, the at least one other parameter being selected based on a predetermined combination of parameters representative of an adverse condition, comparing the associated parameters with a stored data combination threshold specific to the associated parameters, and outputting a signal indicative of an impending situation if the associated parameters are on or beyond the data combination threshold.

Further in accordance with the first aspect, it is determining if any of the plurality of parameters is at or beyond at least a second respective threshold beyond the first threshold by comparing the plurality of parameters with the second respective threshold, and if at least one of the parameters is at or beyond the second respective threshold a signal indicative of an impending situation is output to alert the user of the impending situation;

Still further in accordance with the first aspect, receiving data corresponding to a plurality of parameters comprises receiving a plurality of signals associated with the aircraft, the plurality of signals being emitted; and converting the plurality of signals into the plurality of parameters.

Still further in accordance with the first aspect, receiving data corresponding to a plurality of parameters comprises receiving at least one signal from a sensor.

Still further in accordance with the first aspect, receiving data comprises receiving at least one signal associated with a condition extrinsic to the aircraft.

Still further in accordance with the first aspect, the aircraft is a rotorcraft, and determining if any of the plurality of parameters is at or beyond at least a first respective threshold comprises determining that one of lateral cyclic, longitudinal cyclic and pedal position is an outlier parameter, and wherein identifying at least one other parameter associated to the outlier parameter comprises identifying at least one of slope, wind, gross weight, center of gravity, collective position and torque.

Still further in accordance with the first aspect, the aircraft is a rotorcraft, and determining if any of the plurality of parameters is at or beyond at least a first respective threshold comprises determining that out-of-wind condition is an outlier parameter and wherein identifying at least one other parameter associated to the outlier parameter comprises identifying at least one other parameter associated to the outlier parameter comprises height above ground, vertical velocity, speed, speed trend, gross weight, center of gravity, downward acceleration, power required and power available.

Still further in accordance with the first aspect, the aircraft is a rotorcraft, and determining if any of the plurality of parameters is at or beyond at least a first respective threshold comprises determining that one of vertical velocity, speed, speed trend, collective position, and torque, is an outlier parameter, and wherein identifying at least one other parameter associated to the outlier parameter comprises identifying height above ground, vertical velocity, speed, speed trend, collective position, torque, gross weight, center of gravity, downward acceleration, power required, and power available.

Still further in accordance with the first aspect, the aircraft is a rotorcraft, and determining if any of the plurality of parameters is at or beyond at least a first respective threshold comprises determining that one of pitch, roll, yaw, pitch trend, roll trend, and yaw trend is an outlier parameter, and wherein identifying at least one other parameter associated to the outlier parameter comprises identifying height above ground, vertical velocity, speed, speed trend, collective position, torque, gross weight, center of gravity, downward acceleration, power required, and power available.

Still further in accordance with the first aspect, the aircraft is a rotorcraft, and determining if any of the plurality of parameters is at or beyond at least a first respective threshold comprises determining that one of yaw, yaw rate, yaw acceleration, pedal position, pedal position trend, collective position, torque, out-of-wind condition, groundspeed, indicated airspeed, and indicated airspeed trend is an outlier parameter, and wherein identifying at least one other parameter associated to the outlier parameter comprises prevailing conditions of height above ground, vertical velocity, speed, speed trend, yaw, yaw rate, yaw acceleration, pedal position, pedal position trend collective position, torque, out-of-wind condition, gross weight, center of gravity, downward acceleration, power required, and power available.

In a second aspect, there is provided a system for detecting an impendent situation in an operating aircraft, the system comprising: a data collection module collecting data corresponding to a plurality of parameters related to an operation of the aircraft; a flight management system receiving data from the data collection module, the flight management system comprising a value comparison module for determining if any of the plurality of parameters is at or beyond at least a first respective threshold by comparing the plurality of parameters with the first respective thresholds, a data combiner for identifying at least one other of the plurality of parameters associated to the at least one outlier parameter, the at least one other parameter being selected based on a predetermined combination of parameters representative of an adverse condition, and an adverse event predictor for identifying an impending situation comparing the associated parameters with a stored data combination threshold specific to the associated parameters, the flight management system outputting a signal indicative of an impending situation if the associated parameters are on or beyond the data combination threshold.

Further in accordance with the second aspect, the real-time data collection module comprises a plurality of sensors sending signals in real-time to a signal convertor, the signal convertor converting the plurality of signals into the data corresponding to conditions related to the operation of the aircraft.

Still further in accordance with the second aspect, the real-time data collection module comprises data related to conditions extrinsic to the aircraft.

Still further in accordance with the second aspect, the value comparison module further determines if any of the plurality of parameters is at or beyond at least a second respective threshold beyond the first threshold by comparing the plurality of parameters with the second respective threshold, and the flight management system outputs a signal indicative of an impending situation if at least one of the parameters is at or beyond the second threshold.

Still further in accordance with the second aspect, a rotorcraft comprises the system described above, and the flight management system determines if any of the plurality of parameters is at or beyond at least a first respective threshold by determining that one of lateral cyclic, longitudinal cyclic and pedal position is an outlier parameter, and identifies at least one other parameter associated to the outlier parameter as at least one of slope, wind, gross weight, center of gravity, collective position and torque.

Still further in accordance with the second aspect, a rotorcraft comprises the system described above, and the flight management system determines if any of the plurality of parameters is at or beyond at least a first respective threshold by determining that out-of-wind condition is an outlier parameter and identifies at least one other parameter associated to the outlier parameter as at least one of height above ground, vertical velocity, speed, speed trend, gross weight, center of gravity, downward acceleration, power required and power available.

Still further in accordance with the second aspect, a rotorcraft comprises the system described above, and the flight management system determines if any of the plurality of parameters is at or beyond at least a first respective threshold by determining that one of vertical velocity, speed, speed trend, collective position, and torque, is an outlier parameter, and identifies at least one other parameter associated to the outlier parameter as height above ground, vertical velocity, speed, speed trend, collective position, torque, gross weight, center of gravity, downward acceleration, power required, and power available.

Still further in accordance with the second aspect, a rotorcraft comprises the system described above, and the flight management system determines if any of the plurality of parameters is at or beyond at least a first respective threshold by determining that one of pitch, roll, yaw, pitch trend, roll trend, and yaw trend is an outlier parameter, and identifies at least one other parameter associated to the outlier parameter as at least one of height above ground, vertical velocity, speed, speed trend, collective position, torque, gross weight, center of gravity, downward acceleration, power required, and power available.

Still further in accordance with the second aspect, a rotorcraft comprises the system described above, and the flight management system determines if any of the plurality of parameters is at or beyond at least a first respective threshold by determining that one of yaw, yaw rate, yaw acceleration, pedal position, pedal position trend, collective position, torque, out-of-wind condition, groundspeed, indicated airspeed, and indicated airspeed trend is an outlier parameter, and identifies at least one other parameter associated to the outlier parameter as at least one of height above ground, vertical velocity, speed, speed trend, yaw, yaw rate, yaw acceleration, pedal position, pedal position trend collective position, torque, out-of-wind condition, gross weight, center of gravity, downward acceleration, power required, and power available.

DESCRIPTION OF THE DRAWINGS

Reference is now made to the accompanying figures in which.

DETAILED DESCRIPTION

Figure 1:
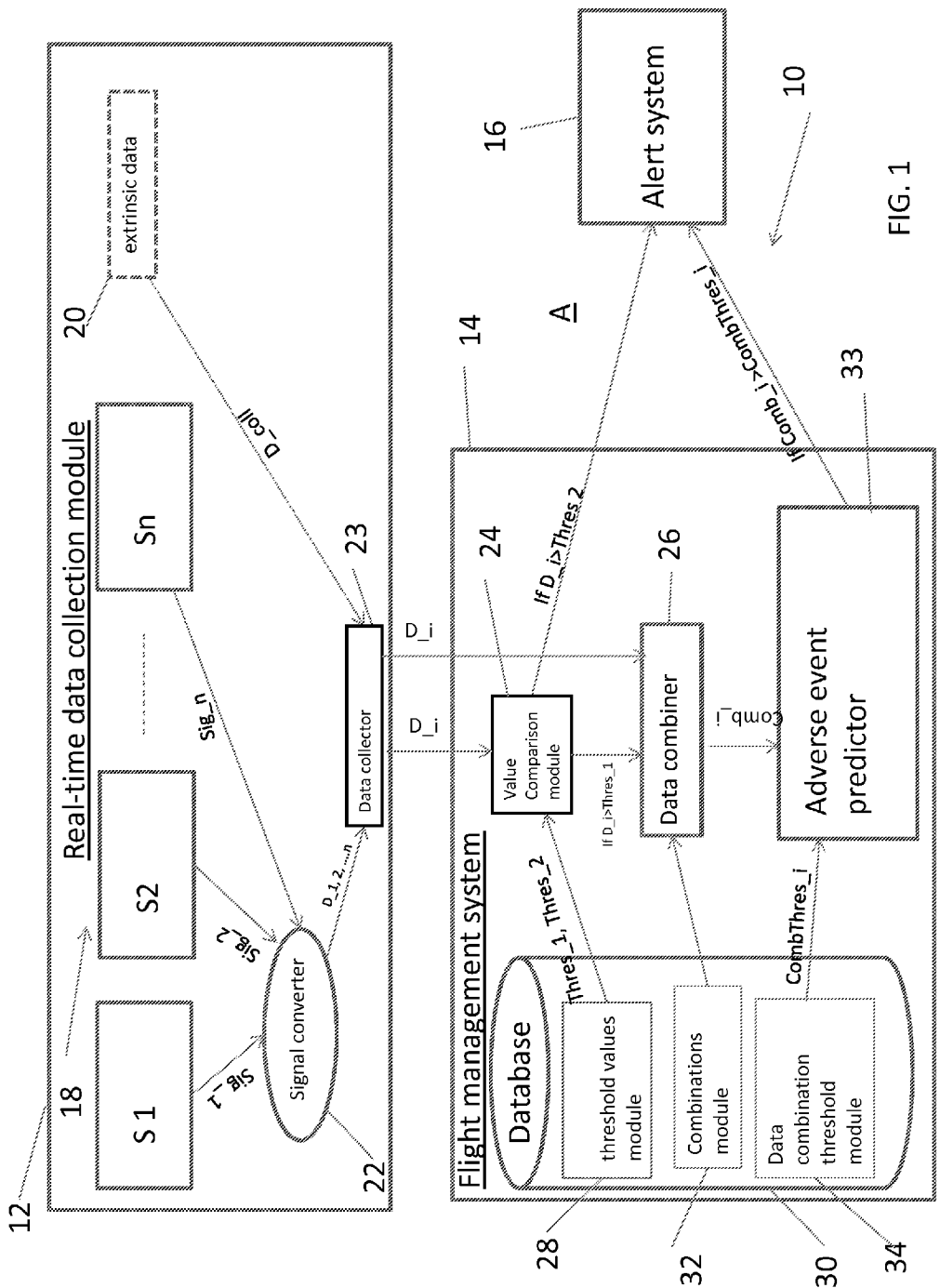
FIG. 1 is a system for detecting and altering in real-time the user of an aircraft of an impendent adverse condition.

The below described system and method may provide real-time monitoring, during some or all of flight phases of an aircraft, of flight parameters, both individual and in combination, that are potential precursors for an adverse event. An adverse event may be defined as one in which one or more parameter values may cause the aircraft to approach aerodynamic conditions that might render control of the aircraft difficult and/or may render avoidance of an accident or incident difficult. For each individual parameter, there may be multiple thresholds values considered. One threshold value may represent the point at which the individual parameter becomes of concern regardless of other parameters, and should trigger an alert. This threshold value may be set to trigger the alert at such a time that the operator of the aircraft has time to react and take corrective measures. Other threshold values may be identified, which other threshold values taken alone do not invoke an alert when reached, but when taken in concert with other parameter threshold values may be precursors to an adverse event. Again, this other threshold value may be set to trigger the alert at such a time that the operator of the aircraft has time to react and take corrective measures. Moreover, the alert may comprise data indicating the nature of the adverse event, and suggestions on corrective actions to return the aircraft to a normal operating state, i.e., away from the adverse event. Examples of parameters include non-exhaustively weight on wheels, rotor rpm, indicated airspeed, vertical speed, vertical acceleration, indicated airspeed rate, heading (yaw) rate, heading (yaw) acceleration, collective control position, transmission torque, cyclic control position, calibrated airspeed, true airspeed, static air temperature, barometric altitude, pressure altitude, density altitude, barometric setting, pitch angle around the lateral axis, pitch rate, pitch acceleration, roll angle around the longitudinal axis, roll rate, roll acceleration, heading angle around the vertical axis at aircraft position, relative to North (magnetic, true, or both), latitude, longitude, GPS altitude, GPS date and time of position, GPS-based horizontal velocity, GPS-based vertical velocity, ground track, estimate of position error, interval of confidence of position error, pedal position, wind velocity, mast moment, aircraft airborne/on-ground status, system magnetic variation, system height above ground level, system drift angle, total fuel available, total fuel flow, estimated endurance, estimated range, coordinates of previous waypoint ('from' waypoint), coordinates of active waypoint ('to' waypoint), coordinates of next waypoint (next waypoint), desired track (DTK), bearing to active waypoint, estimated time of arrival at active waypoint (ETA), time to next turn, time to go to active waypoint (TTG), distance to active waypoint (DTG), To/From indicator, next leg desired track, leg flight path angle, desired course to steer, desired altitude, cross-track distance (XTK), track angle error (TKE), altitude error, next leg cross-track distance, next leg track angle error, desired aircraft bank angle ("roll command"), desired vertical speed, autopilot modes, among others. There are numerous parameters, and in-flight human monitoring of combinations of thresholds may prove impossible.

The below described system and method may use readily-available aircraft state data to identify the relevant parameters, cross-compare these relevant parameters to identify proximity to, or onset of, potential adverse events, assess severity based on operating conditions (GW, CofG, DA, power required/available, aircraft susceptibility, etc.) and provide relevant alerting (e.g. audio and/or visual) to the pilot of the particular condition of concern in time to allow pilot intervention and recovery.

Referring to FIG. 1, a system 10 for detecting and alerting the pilot in real-time or quasi real-time of an impendent adverse condition is shown as being part of an aircraft A. The system 10 may include a real-time/quasi-real-time data collection module 12, either as a module within a flight management system 14 or as a stand-alone system, and an alert system 16, among other possible components. The real-time data collection module 12 collects and produces data related to flight parameters. The real-time data collection module 12 communicates with the flight management system (FMS) 14 which determines if the data provided by the real-time data collection module 12 corresponds to the onset of an adverse condition. If an onset of an adverse condition is detected, the FMS 14 communicates with the alert system 16 to emit an alert toward the aircraft user. The FMS 14 may be an existing component of the aircraft, to which some modules are added to perform the operations described hereinafter, or may be a stand-alone system as well. The FMS 14 may be referred to with other names, such as flight data monitoring system, flight control system, etc. Likewise, the alert system 16 may be provided on an interface of the FMS 14, as a visual or audible output, or may be associated with separate dedicated indicator components in proximity to the pilot. The system 10 is constructed to function in real-time or quasi real-time, so as to alert the aircraft user rapidly just prior to or upon occurrence of an adverse condition, for correction actions to be taken if necessary.

The real-time data collection module 12 includes a plurality of sensors $S1, \ldots, Sn$ referred commonly as 18, which monitor or measure various parameters related to the operation of the aircraft. The sensors 18 are of any appropriate type to measure the parameters listed above. The sensors 18 may be standard equipment of aircraft A, and may also include other sensors added to measure supplemental features. The real-time data collection module 12 may also include one or more extrinsic data source 20 which gathers data D_coll not pertaining to the aircraft but evolving during the use of the aircraft. Example of such data includes weather conditions, the data D_coll also part of the parameters taken into consideration by the system 10 of the present disclosure in assessing the occurrence of an adverse condition. D_coll may also correspond to data registered before flight, for example, a weight of the aircraft, a center of gravity, flight risk assessment data, for example. Some parameters of D_coll may be alternatively or concurrently measured by the sensors 18. For instance, sensors 18 may include temperature sensors to measure ambient temperature.

The plurality of sensors 18 emit corresponding signals $Sig\_1, \ldots, Sig_n$ which are converted into readable parameters $D\_1, \ldots, D\_n$ by a signal converter 22. The data generated by the signal converter 22 is sent to a data collector 23. The data collector 23 gathers all readable parameters including $D\_1, \ldots, D\_n$ and the data D_coll. It is contemplated that the data collector 23 could be omitted and the data sent individually or in groups to the FMS 14 directly. Moreover, the data collector 23 may be part of the FMS 14.

The data collector 23 communicates the data D_i (i=1, . . . , n, coll) to a value comparison module 24 of the FMS 14. The value comparison module 24 compares individually the received data D_i to threshold values stored in a threshold values module 28 of a database 30 of the FMS 14. For each parameter associated with the data D_i, the threshold values module 28 stores a first threshold Thres_1, and a second threshold Thres_2 beyond the first threshold Thres_1. There may be other thresholds as well for each single parameter, however for simplicity the description will refer to a pair of thresholds. By "beyond", it is meant that the second threshold Thres_2 is farther from the normal parameter value than the first threshold Thres_1. The first threshold value Thres_1 is a value of the parameter at or beyond which and within second threshold Thres_2, when the parameter is taken individually, no adverse event may occur but, when combined with one or more other parameters (which also may or may not be at or beyond first threshold value Thres_1), an adverse event may occur. The second threshold Thres_2 is a value of the parameter at or beyond which, when the parameter is taken individually, an adverse event may occur.

The value comparison module 24 performs a constant monitoring of the parameters. Considering the potentially high number of parameters measured by the system 10, and the continuous and/or high frequency of the signalling, the processing unit of the FMS 14 must have suitable computing specifications to gather this data and operate the system 10 in real time or quasi real time. The value comparison module 24 thus performs two comparisons, in filtering the large volume of data it receives. The value comparison module 24 determines if any of the current parameters, taken individually, is outside of an acceptable range, i.e., outside the related second threshold (e.g. if D_i=1, ..., n, coll>Thres_2). If any given one of the parameters being monitored is outside its related second threshold, the value comparison module 24 communicates with the alert system 16 to emit, for example, an audio or visual signal to the user (e.g. pilot) of the aircraft.

The value comparison module 24 determines if any of the current parameters, taken individually, is at or beyond the first threshold value Thres_1 which may indicate, when taken in combination with one or more other parameters, the onset of an adverse event (e.g. if D_i=1, ..., n, coll>Thres_1). If this is the case, the value comparison module 24 communicates with a data combiner 26 of the FMS 14. The comparisons may be done concurrently, in real time or quasi real time.

The data combiner 26 receives from the value comparison module 24 the identity of the outlying parameter, i.e., which one of the parameters D_1, ..., n, coll was beyond the first threshold value Thres_1 and seeks and identifies from the database an identity of the parameter(s) with which the outlying parameter may be paired or grouped to lead to the outset of an adverse event. The data combiner 26 combines the data D_1, ..., D_n, D_coll into various combinations (ex: pairs, triplets) Comb_i (i=1 ... m) of data provided by a combinations module 32. The combinations provided by the combinations module 32 are predetermined based on the analysis of past behavior of the aircraft and/or on aircraft behavioral knowledge, or any other form of analysis of aircraft behavior and operation. For example, a speed of a helicopter may be combined with yaw rate because it has been found that when the yaw rate is above a certain threshold, when combined with a speed in excess of another threshold, an adverse event can occur. The predetermined type of combinations is data inputted to the FMS 14 before use of the system 10.

The data combiner 26 communicates combinations Comb_i made with these parameters D_1, ..., D_n, D_coll which are above the first threshold value Thres_1 to an adverse event predictor 33 of the FMS 14. The adverse event predictor 33 communicates with a data combination threshold module 34 stored in the database 30. The data combination threshold module 34 contains pre-programmed values CombThres_i of the combinations of parameters which may cause the aircraft to approach aerodynamic conditions that might render control and/or recovery from an accident or incident difficult, the values CombThres_i being set to give the user sufficient time to react to any indication of prediction of adverse condition. Taking the above example, one data combination threshold may be a threshold value of a yaw rate only when combined with a threshold value of the aircraft speed. The adverse event predictor 33 compares the combinations Comb_i given by the data combiner 26 to the data combination threshold CombThres_i given by the data combination threshold module 34 to determine if the current measured yaw rate and speed parameters are precursory of an adverse event. If the adverse event predictor 33 detects a combination of data beyond a non-acceptable range (e.g. if Comb_i>CombThres_i), the adverse event predictor 33 communicates with the alert system 16 to emit, for example, an audio and/or visual signal to the user (e.g. pilot) of the aircraft.

Figure 2:
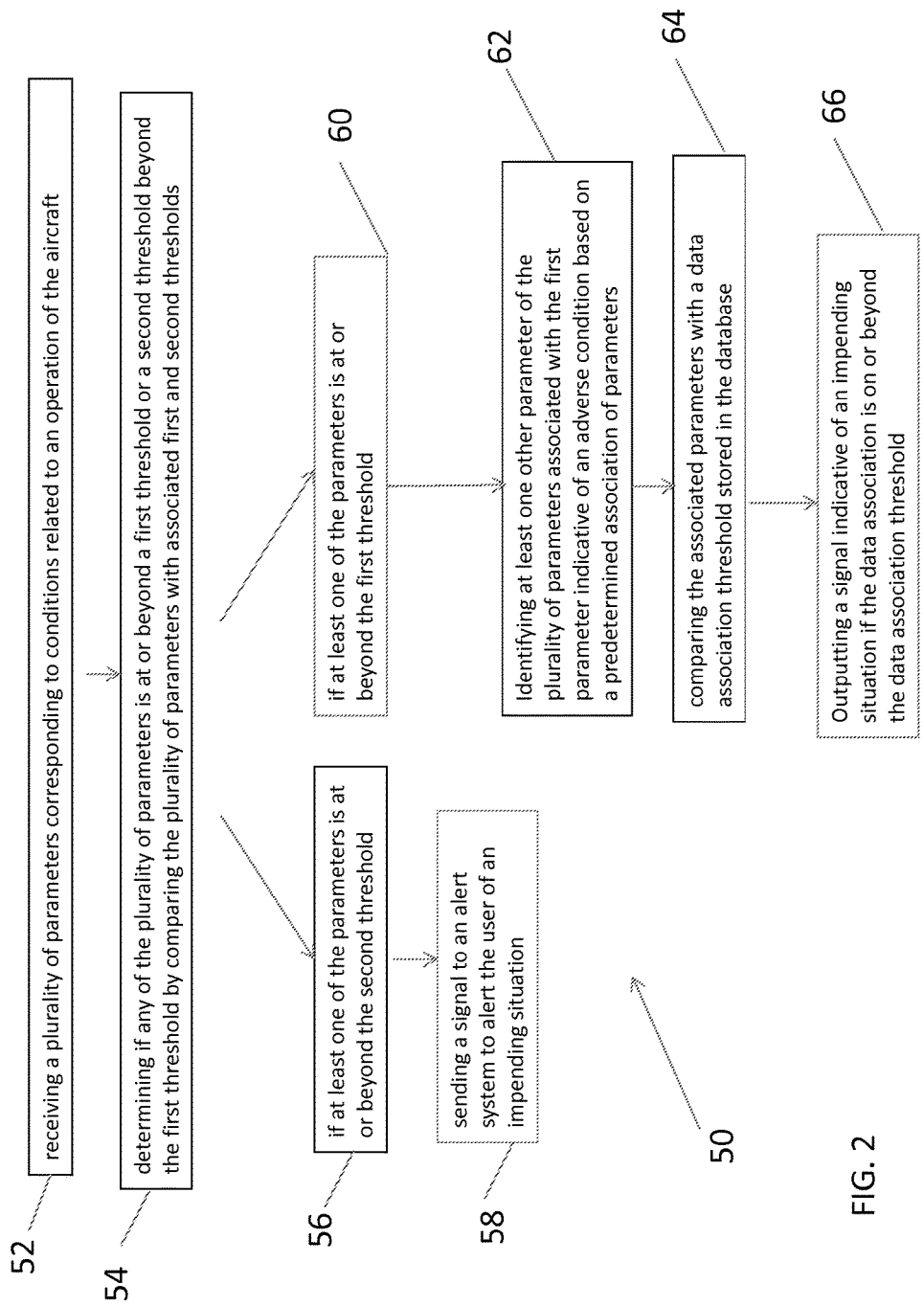
FIG. 2 is a flow chart of a method for detecting and alerting in real-time the user of an aircraft of an impendent adverse condition using the system of FIG. 1.

Turning now to FIG. 2, a method 50 for detecting and alerting the user of the aircraft of an impendent situation using the above system 10 will be described. The method 50 makes reference to the system 10 and its various components for illustrative purposes. It is however contemplated to operate the method 50 with a system different than the system 10.

In step 52, data is received from the data collection module 12. The data may be measured, read, interpreted, and may be continuously received at a high frequency. The data correspond to parameters related to an operation of the aircraft. The data may originate from the plurality of sensors S_1, ..., S_n and/or from the extrinsic data collector 20. The plurality of signals S_1, ..., S_n may be converted by the signal converter 22 into readable data D_1, ..., D_n before being transmitted to the data combiner 26 and/or the value comparison module 24 of the FMS 14.

In 54, the readable parameters D_1, ..., D_n, D_coll are inputted in the value comparison module 24 and compared with the threshold values from the threshold value module 28 to determine if any of the plurality of parameters D_1, ..., D_n, D_coll taken individually, are at or beyond the first threshold Thres_1 or at or beyond the second threshold Thres_2. If at least one of the measured parameters is at or beyond the second threshold Thres_2, the method goes to step 56, and, at step 58, sends a signal to the alert system 16 to alert the user of an impending situation, or of an outlying parameter. If at least one of the measured parameters is at or beyond the first threshold Thres_1 but within the second threshold Thres_2, the method 50 goes to step 60 and sends the at least one parameter to the data combiner 26 of the FMS 14.

From step 60, the method 50 goes to step 62, an association is made for instance by the data combiner 26 between the at least one parameter at or beyond the first threshold Thres_1 and at least one other of the plurality of parameters D_1, .... D_n, D_coll, D_pred into a combination Comb_i (i=1 ... m), to identify one or more parameters that can be paired with the outlying parameter into a prediction of an adverse condition, for instance by seeking through a database preprogrammed with this data. The selection of the parameters is associated with the outlier parameter of the first threshold Thres_1 based on a predetermined combination of data provided by the combinations module 32, and determined to be indicative of an adverse event. The combinations Comb_i (i=1 ... m) may be made of two or more parameters.

In step 64, a comparison is made for instance by the adverse event predictor 33 between the combinations of data Comb_i (i=1 ... m) formed by the data combiner 26 and a data combination threshold module 34 of the database 30. If a value set of at least one of the combinations of data Comb_i (i=1 ... m) is beyond a value set of a corresponding combination of the data combination threshold CombThres_i of the combination threshold module 34, the method 50 goes to step 66 at which a signal is sent to the alert system 16 to alert the user of an impending situation. The alert may have any of a plurality of forms, including information on the impending situation and an identification of the parameters leading to the impending situation. Moreover, the alert may include information for guiding the user in taking corrective measures to restore the non-adverse condition of the aircraft A. To some extent, the FMS 14 may control the operation of the aircraft A to prevent the progression of the parameter toward the second threshold Thres_2.

Examples of implementations of the above method 50 will now be described.

First Instance—Dynamic Rollover:

In a first instance, with a helicopter or like rotorcraft running on the ground, the pilot has inadvertently established one or more excessive control positions (lateral cyclic, longitudinal cyclic, and/or pedal position) for the prevailing conditions (slope, wind, gross weight, CofG, etc.) while increasing collective position and torque to taxi or take off. The FMS 14 compares the control positions received from the aircraft sensors 18 to the predetermined thresholds values CombThres_i corresponding to a potential adverse event (such as dynamic rollover). The FMS 14 may input additional severity considerations based on operating conditions, such as wind direction and speed. The FMS 14 will provide, for example, an audible alert (e.g. "Cyclic!", or "Pedal!") if the control positions are within the range of the predetermined thresholds values CombThres_i. As a result, the pilot will be alerted before collective position and/or torque applied reach a hazardous level.

Second Instance—Downwind Approach:

In a second instance, the aircraft parameter data D_1, . . . , D_n, D_coll received is related to, for example, height above ground, vertical velocity, speed, speed trend, gross weight, center of gravity, downward acceleration, power required and power available thereby allowing determination that a deceleration to an out-of-ground-effect low speed flight condition, or an approach to an in-ground-effect hover is underway. Air data and GPS data allow determination of a potentially significant out-of-wind condition, i.e., the outlier parameter. The values received by the data collector 23 are compared with the predetermined threshold values CombThres_i. The predetermined threshold values CombThres_i may be associated with a potential adverse event such as downwind approach, tail strike, and loss of tail rotor authority. Additional severity considerations based on operating conditions (GW, CofG, DA, power required/available, aircraft susceptibility, etc) may be inputted to the data collector 23 and ultimately to the combiner 26. An audible alert (e.g. "Downwind!", "Downwind Approach!"), for example, may be produced by the alert system 16 while the adverse condition is still avoidable.

Third Instance—Settling with Power:

In a third instance, the aircraft parameter data D_i collected by the data collector 23 may be related to vertical velocity, speed, speed trend, collective position, torque, etc. allowing determination that a critical combination of low forward speed, descent rate, power demand and terrain proximity are being approached. Additional severity considerations based on operating conditions (height above ground, vertical velocity, speed, speed trend, collective position, torque, gross weight, center of gravity, downward acceleration, power required, and power available, aircraft susceptibility, etc) may be inputted to the data collector 23 and ultimately to the combiner 26. An audible alert (e.g. "Power Settling!"), for example, may be produced while recovery from the condition is still possible with minimum piloting skill.

Fourth Instance—Excessive Attitude:

In a fourth instance, the aircraft parameter data D_i collected by the data collector 23 may be related to pitch, roll, yaw, pitch trend, roll trend, and yaw trend allowing determination that the helicopter is exceeding pre-determined attitude values for the given flight condition, e.g. excessive pitch attitude during take-off Additional severity considerations based on operating conditions (GW, CofG, DA, power required/available, aircraft susceptibility, etc) may be inputted to the data collector 23 and ultimately to the combiner 26. An audible alert (e.g. "Pitch!"), for example, may be emitted while recovery from the condition is still possible with minimum piloting skill.

Fifth Instance—Excessive Yaw Rate:

In a fifth instance, the aircraft parameter data D_i collected by the data collector 23 may be related to height above ground, groundspeed, indicated airspeed, collective position, torque, pitch, roll, yaw, yaw rate, yaw acceleration, pedal position, pedal position trend, etc. allowing determination that the helicopter is exceeding pre-determined yaw/yaw rate values for the given flight condition, e.g. quartering tailwind. Additional severity considerations based on operating conditions (vertical velocity, speed, speed trend, collective position, torque, gross weight, center of gravity, downward acceleration, power required, power available and aircraft susceptibility, etc) may be inputted to the data collector 23 and ultimately to the combiner 26. An audible alert (e.g. "Yaw Rate!"), for example, may be emitted while recovery from the condition is still possible with minimum piloting skill.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims. The methods and systems described herein have been described and shown with reference to particular steps and modules, respectively, performed in a particular order. It should be understood that these steps and modules may be combined, subdivided or reordered to form an equivalent method without departing from the present disclosure.

The invention claimed is:

1. A method for detecting an impendent situation of an operating aircraft, the method comprising:
   receiving data corresponding to a plurality of parameters related to an operation of the aircraft;
   determining if any of the plurality of parameters is at or beyond at least a first respective threshold by comparing the plurality of parameters with the first respective thresholds;
   if at least one of the parameters is an outlier parameter at or beyond its first respective threshold:
      identifying at least one other of the plurality of parameters associated to the at least one outlier parameter, the at least one other parameter being selected based on a predetermined combination of parameters representative of an adverse condition,
      comparing the associated parameters with a stored data combination threshold specific to the associated parameters, and
      outputting a signal indicative of an impending situation if the associated parameters are on or beyond the data combination threshold;
   determining if any of the plurality of parameters is at or beyond at least a second respective threshold beyond the first threshold by comparing the plurality of parameters with the second respective threshold; and
   if at least one of the parameters is at or beyond the second respective threshold, outputting a signal indicative of an impending situation to alert the user of the impending situation.

2. The method of claim 1, wherein receiving data corresponding to a plurality of parameters comprises receiving a plurality of signals associated with the aircraft, the plurality of signals being emitted; and converting the plurality of signals into the plurality of parameters.

3. The method of claim 2, wherein receiving data corresponding to a plurality of parameters comprises receiving at least one signal from a sensor.

4. The method of claim 1, wherein receiving data comprises receiving at least one signal associated with a condition extrinsic to the aircraft.

5. The method of claim 1, wherein the aircraft is a rotorcraft, and wherein determining if any of the plurality of parameters is at or beyond at least a first respective threshold comprises determining that one of lateral cyclic, longitudinal cyclic and pedal position is an outlier parameter, and wherein identifying at least one other parameter associated to the outlier parameter comprises identifying at least one of slope, wind, gross weight, center of gravity, collective position and torque.

6. The method of claim 1, wherein the aircraft is a rotorcraft, and wherein determining if any of the plurality of parameters is at or beyond at least a first respective threshold comprises determining that out-of-wind condition is an outlier parameter and wherein identifying at least one other parameter associated to the outlier parameter comprises identifying at least one other parameter associated to the outlier parameter comprises height above ground, vertical velocity, speed, speed trend, gross weight, center of gravity, downward acceleration, power required and power available.

7. The method of claim 1, wherein the aircraft is a rotorcraft, and wherein determining if any of the plurality of parameters is at or beyond at least a first respective threshold comprises determining that one of vertical velocity, speed, speed trend, collective position, and torque, is an outlier parameter, and wherein identifying at least one other parameter associated to the outlier parameter comprises identifying height above ground, vertical velocity, speed, speed trend, collective position, torque, gross weight, center of gravity, downward acceleration, power required, and power available.

8. The method of claim 1, wherein the aircraft is a rotorcraft, and wherein determining if any of the plurality of parameters is at or beyond at least a first respective threshold comprises determining that one of pitch, roll, yaw, pitch trend, roll trend, and yaw trend is an outlier parameter, and wherein identifying at least one other parameter associated to the outlier parameter comprises identifying height above ground, vertical velocity, speed, speed trend, collective position, torque, gross weight, center of gravity, downward acceleration, power required, and power available.

9. The method of claim 1, wherein the aircraft is a rotorcraft, and wherein determining if any of the plurality of parameters is at or beyond at least a first respective threshold comprises determining that one of yaw, yaw rate, yaw acceleration, pedal position, pedal position trend, collective position, torque, out-of-wind condition, groundspeed, indicated airspeed, and indicated airspeed trend is an outlier parameter, and wherein identifying at least one other parameter associated to the outlier parameter comprises prevailing conditions of height above ground, vertical velocity, speed, speed trend, yaw, yaw rate, yaw acceleration, pedal position, pedal position trend collective position, torque, out-of-wind condition, gross weight, center of gravity, downward acceleration, power required, and power available.

10. A system for detecting an impendent situation in an operating aircraft, the system comprising:
a data collection module collecting data corresponding to a plurality of parameters related to an operation of the aircraft;
a flight management system receiving data from the data collection module, the flight management system comprising
a value comparison module for determining if any of the plurality of parameters is at or beyond at least a first respective threshold by comparing the plurality of parameters with the first respective thresholds and for determining if any of the plurality of parameters is at or beyond at least a second respective threshold beyond the first threshold by comparing the plurality of parameters with the second respective threshold,
a data combiner for identifying at least one other of the plurality of parameters associated to the at least one outlier parameter, the at least one other parameter being selected based on a predetermined combination of parameters representative of an adverse condition, and
an adverse event predictor for identifying an impending situation comparing the associated parameters with a stored data combination threshold specific to the associated parameters,
the flight management system outputting a signal indicative of an impending situation if the associated parameters are on or beyond the data combination threshold and outputting a signal indicative of an impending situation if at least one of the parameters is at or beyond the second threshold.

11. The system of claim 10, wherein the real-time data collection module comprises a plurality of sensors sending signals in real-time to a signal convertor, the signal convertor converting the plurality of signals into the data corresponding to conditions related to the operation of the aircraft.

12. The system of claim 10, wherein the real-time data collection module comprises data related to conditions extrinsic to the aircraft.

13. A rotorcraft comprising the system of claim 10, wherein the flight management system determines if any of the plurality of parameters is at or beyond at least a first respective threshold by determining that one of lateral cyclic, longitudinal cyclic and pedal position is an outlier parameter, and identifies at least one other parameter associated to the outlier parameter as at least one of slope, wind, gross weight, center of gravity, collective position and torque.

14. A rotorcraft comprising the system of claim 10, wherein the flight management system determines if any of the plurality of parameters is at or beyond at least a first respective threshold by determining that out-of-wind condition is an outlier parameter and identifies at least one other parameter associated to the outlier parameter as at least one of height above ground, vertical velocity, speed, speed trend, gross weight, center of gravity, downward acceleration, power required and power available.

15. A rotorcraft comprising the system of claim 10, wherein the flight management system determines if any of the plurality of parameters is at or beyond at least a first respective threshold by determining that one of vertical velocity, speed, speed trend, collective position, and torque, is an outlier parameter, and identifies at least one other parameter associated to the outlier parameter as height above ground, vertical velocity, speed, speed trend, collective position, torque, gross weight, center of gravity, downward acceleration, power required, and power available.

16. A rotorcraft comprising the system of claim 10, wherein the flight management system determines if any of the plurality of parameters is at or beyond at least a first respective threshold by determining that one of pitch, roll, yaw, pitch trend, roll trend, and yaw trend is an outlier parameter, and identifies at least one other parameter associated to the outlier parameter as at least one of height above ground, vertical velocity, speed, speed trend, collective position, torque, gross weight, center of gravity, downward acceleration, power required, and power available.

17. A rotorcraft comprising the system of claim 10, wherein the flight management system determines if any of the plurality of parameters is at or beyond at least a first respective threshold by determining that one of yaw, yaw rate, yaw acceleration, pedal position, pedal position trend, collective position, torque, out-of-wind condition, groundspeed, indicated airspeed, and indicated airspeed trend is an outlier parameter, and identifies at least one other parameter associated to the outlier parameter as at least one of height above ground, vertical velocity, speed, speed trend, yaw, yaw rate, yaw acceleration, pedal position, pedal position trend collective position, torque, out-of-wind condition, gross weight, center of gravity, downward acceleration, power required, and power available.

* * * * *